United States Patent
Fessler et al.

(10) Patent No.: US 12,398,068 B2
(45) Date of Patent: Aug. 26, 2025

(54) FUNCTIONAL COATED ARTICLE

(71) Applicant: Glas Trösch AG, Bützberg (CH)

(72) Inventors: Gregor Fessler, Zürich (CH); Christian Grogg, Herzogenbuchsee (CH); Andriy Romanyuk, Derendigen (CH); Aneliia Wäckerlin, Dietikon (CH)

(73) Assignee: Glas Trösch AG, Bützberg (CH)

( * ) Notice: Subject to any disclaimer, the term of this patent is extended or adjusted under 35 U.S.C. 154(b) by 0 days.

(21) Appl. No.: 18/226,718

(22) Filed: Jul. 26, 2023

(65) Prior Publication Data

US 2023/0373851 A1   Nov. 23, 2023

Related U.S. Application Data

(62) Division of application No. 17/431,136, filed as application No. PCT/EP2019/053826 on Feb. 15, 2019, now Pat. No. 11,753,332.

(51) Int. Cl.
    *C03C 17/36* (2006.01)
(52) U.S. Cl.
    CPC ...... *C03C 17/3639* (2013.01); *C03C 17/3626* (2013.01); *C03C 17/3634* (2013.01); *C03C 17/3642* (2013.01); *C03C 17/3644* (2013.01); *C03C 2217/78* (2013.01)

(58) Field of Classification Search
    CPC .......... C03C 17/3694; C03C 2218/153; C03C 17/3441; C03C 17/3634; C23C 16/26–279
    See application file for complete search history.

(56) References Cited

U.S. PATENT DOCUMENTS

| | | | |
|---|---|---|---|
| 4,565,719 A | 1/1986 | Phillips et al. | |
| 5,942,090 A | 8/1999 | Ebisawa et al. | |
| 2003/0215642 A1 | 11/2003 | Carre et al. | |
| 2011/0135914 A1* | 6/2011 | Murphy | C23C 14/58 428/428 |
| 2014/0072784 A1 | 3/2014 | Dietrich et al. | |
| 2016/0243520 A1* | 8/2016 | Ukigai | C23C 16/27 |
| 2016/0368817 A1* | 12/2016 | Krasnov | C03C 23/0015 |
| 2018/0127307 A1 | 5/2018 | Muller et al. | |

* cited by examiner

*Primary Examiner* — Alex A Rolland

(74) *Attorney, Agent, or Firm* — Procopio, Cory Hargreaves & Savitch LLP

(57) ABSTRACT

A process to produce a scratch resistant coated article includes providing a flat glass substrate having a surface to be coated, and depositing a multilayered coating on the surface in corresponding sequence coming from the surface, a functional layer stack including at least one metallic silver inclusive layer sandwiched between two dielectric layers, a transition metal (TM) inclusive layer including carbon in a molar amount, which at least in a region of an outer surface of the TM inclusive layer equals at least the molar metal amount of TM metals, and a hydrogen containing layer in direct contact to the outer surface of the TM inclusive layer as an outermost layer of the coating.

9 Claims, 11 Drawing Sheets

Fig.3A

Figure 1:
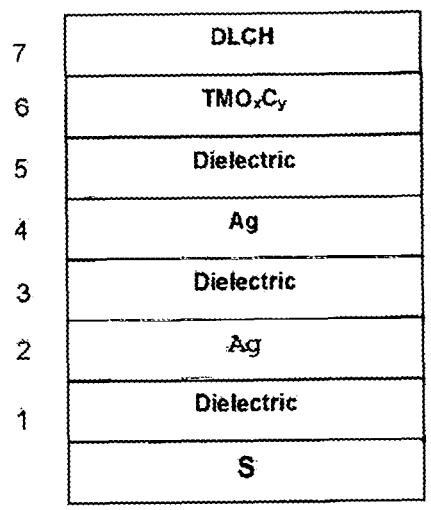

| SnZnOx |
| Si3N4 |
| S |

Fig.3B

| SnZnOx |
| SnO2 |
| S |

Fig.3C

| TiOx |
| Si3N4 |
| S |

Fig.3D

| SnZnOx |
| TiOx |
| S |

Fig.3E

| TiOx |
| SnO2 |
| S |

Fig.3F

| TiOx |
| SnZnOx |
| SnO2 |
| S |

Fig.3G

| TiZrOx |
| TiOx |
| SnZnOx |
| SnO2 |
| S |

Fig.3H

| TiOx |
| TiZrOx |
| TiOx |
| SnZnOx |
| SnO2 |
| S |

Fig. 3I

| SnZnOx |
|---|
| TiOx |
| TiZrOx |
| TiOx |
| SnZnOx |
| SnO2 |
| S |

Fig. 3J

| SnZnOx |
|---|
| TiOx |
| TiZrOx |
| TiOx |
| SnZnOx |
| SnO2 |
| S |

Fig. 3K

| SnZnOx |
|---|
| TiOx |
| TiNbOx |
| TiOx |
| SnZnOx |
| S |

Fig. 3L

| SnZnOx |
|---|
| TiOx |
| TiNbOx |
| NbOx |
| SnZnOx |
| Si3N4 |
| S |

Fig. 3M

| SnZnOx |
|---|
| TiOx |
| TiZrOx |
| TiOx |
| SnZnOx |
| Si3N4 |
| S |

Fig. 3N

| SnZnOx |
|---|
| TiZrOx |
| TiNbOx |
| TiOx |
| SnZnOx |
| S |

FUNCTIONAL COATED ARTICLE

CROSS-REFERENCE TO RELATED APPLICATIONS

This application is a divisional of U.S. application Ser. No. 17/431,136, filed Aug. 13, 2021, which is a U.S. National Stage entry of PCT Application No: PCT/EP2019/053826 filed Feb. 15, 2019, the contents of which are incorporated herein by reference.

The invention refers to a process to produce a scratch resistant functional product according to an exemplary aspect. The invention also refers to a surface protected coated article according to another exemplary aspect, the article including a functional layer stack.

TECHNICAL BACKGROUND

Methods to protect functional coated intermediate glass products during handling, e.g. assembling, by a carbon based hard coating which is burnt away in a following tempering process are known from the state of the art.

From WO 2006/057846 A1 it is known to realize such a process by use of a linear ion beam source to produce a diamond like carbon (DLC) coated intermediate product which is heat treated (HT) in a following process step whereby the DLC coating is burned away to give an end-product having an outer post-HT layer comprising zirconium oxide.

From WO2015019022A1 a process for protecting an article is known comprising an application of a temporary protective layer on a portion of a functional coating. The temporary protective layer comprises cured methacrylate compounds having a thickness of at least 1 μm.

However, state of the art coatings and processes each show certain drawbacks as e.g. linear ion beam sources which are expensive and difficult to scale up for substrate widths>1 m. Further on high compressive stress up to 10 GPa may be produced by such coatings which may cause delamination from the substrate.

On the other hand, relatively thick hard carbon coatings, with a thickness essentially higher 50 nm may provide excessive combustion heat to an atmospheric tempering process and in addition add to a high dust burden during tempering, while leaving unwanted residuals on the respective surface.

Therefore, the present invention aims to provide an alternative process easier, more reliable and/or more cost effective to install and/or handle as well as to intermediate and end-products showing at least equal or even better performance than similar state of the art products.

At the same time mechanical properties like scratch resistance and/or hardness of DLCH protected articles, which can be intermediate products, as well as the respective properties of a tempered, so called end-product should be improved. Therefore, as an example adhesion at the interfaces between the layers, e.g. between the DLC-top layer and the rest of the coating is an important parameter. However coating quality is not reflected by one parameter only wherefore different physical and chemical parameters which may be crucial for the overall coating performance of the coated article (the so called intermediate or end-product) will be introduced with reference to a best performance practice.

SUMMARY OF THE INVENTION

In one embodiment of the invention, a process to produce a scratch resistant functional article or product is disclosed, the process comprising the following steps:

providing an essentially flat glass substrate having a surface to be coated, and
depositing a multilayered coating on the surface in corresponding sequence coming from the surface:
a functional layer stack comprising at least one metallic silver inclusive layer sandwiched and in direct contact between two dielectric layers;
a transition metal (TM) inclusive layer comprising carbon in a molar amount, which at least in the region of a final surface of the TM inclusive layer equals at least the molar amount of TM metal in the respective region, the final surface being the outer surface of the TM inclusive layer;
a hydrogen containing DLC (DLCH) layer in direct contact to the final surface of the TM inclusive layer as an outermost layer of the coating.

Such articles, before being processed with a tempering process are also called intermediate products, whereas such articles after a merely optional high temperature tempering process, which essentially burns away the DLCH layer, are also referred to as end-products.

Intermediate products for some applications can be seen as protected end-products for a rigid assembling environment as mentioned with the state of the art, however, intermediate products can be used also for certain applications without high temperature tempering, e.g. instead of the end product itself as will be discussed further below. With reference to the use of the terms inner and outer with the present description, an inner surface of a layer is the surface directed towards the substrate and therefore is the surface which is nearer to the substrate surface, whereas the outer surface of a layer is directed away from the substrate surface and therefore is the surface which is further away from the substrate surface.

In an embodiment of the invention depositing of the TM inclusive layer may comprise sputtering an, e.g. at least partially oxidized TM target, or a metallic TM target in a carbon gas containing sputter-atmosphere. The sputter atmosphere will also comprise an inert gas, depending on the percentage of carbon which should be included into the TM inclusive layer and may optionally comprise oxygen also. The TM target may consist of at least one of the following TM metals, their carbides, oxides or respective carboxides: Co, Cr, Fe, Hf, Nb, Mn, Mo, Ni, Sn, Ta, Ti, V, W, Y, Zn, Zr in the following denominated as TM metals or TM in case of chemical notation and formulas.

With such a process depositing of the low-E stack may comprise in corresponding sequence at least the following process steps:

sputtering a target comprising or consisting of at least one of Ti, TiZr, Zr, TiNb, Nb, Sn, SnZn, Si, Si:Al, or its respective oxides e.g. a Ti, TiZr, Zr, Si, Si:Al, Sn or SnZn target in metallic or at least partially, or fully oxidized ceramic state, like $TiO_x$, $TiZrO_x$, $ZrO_x$, $SiO_x$, $Si:AlO_x$, in a reactive atmosphere containing at least one of nitrogen and oxygen to produce an oxidic, nitridic, or oxynitridic Ti, TiZr, Zr, TiNb, Nb, Sn or SnZn, Si or Si:Al inclusive basic layer, consisting of respective "basic layer material". The terms oxidic, nitridic or oxynitridic also comprise sub-stoichiometric compounds, e.g. from 80 to 100% of the usual atomic metal to non-metal rate, e.g. from $MeO_{2-0.4}$ to the stoichiometric $MeO_2$, in the case of Zn and $Sn^{II}$ from $MeO_{1-0.2}$ to the stoichiometric MeO, and in analogy to respective nitrides or oxynitrides;

optionally sputtering a target comprising or consisting of at least one of Zn, Zn:Al, SnZn, Ti, Ti:Al, Zr, TiZr or its respective oxides in an atmosphere containing at least one of an inert gas and oxygen to produce a seed layer (1"), consisting of at least one of sub-stoichiometric zinc oxide ($ZnO_x$), sub-stoichiometric aluminum doped zinc oxide ($ZnO_x$:Al), respective tin zinc oxide (SnZnOx), titanium oxide (TiOx), aluminum doped titanium oxide (TiOx:Al), zirconium oxide (ZrOx), titanium zirconium oxide (TiZrOx), directly on the surface of the basic layer; Where at with sub-oxidic layers an oxygen saturation may be provided from about 50 to 100%, or 50 to 80%, e.g. ZnO to $ZnO_2$ or $ZnO_{2-0.4}$; and sputtering a silver containing target in an inert gas atmosphere to produce a silver inclusive layer directly on the surface of the basic layer or directly on the surface of the optional seed layer, between the silver inclusive layer and the basic layer;

sputtering a target consisting of at least one of Ti, Ni, Cr, Zn, Zn:Al or respective metal oxide(s), like $TiO_x$, $NO_xi$, $CrO_x$, $ZnO_x$, $ZnO_x$:Al in an atmosphere containing at least one of an inert gas and oxygen, to produce a blocking layer (3', 5') consisting of at least one of Ti, NiCr, Zn, Zn:Al, sub stoichiometric $TiO_x$, sub stoichiometric $NiCrO_x$, sub stoichiometric $ZnO_x$ sub stoichiometric $ZnO_x$:Al directly on the surface of the silver inclusive layer;

sputtering a target comprising or consisting of at least one of Nb, Sn, Ti, Zn, Zr or its respective oxides, like $NbO_x$, $SnO_x$, $TiO_x$, $ZnO_x$, $ZrO_x$ in an atmosphere containing at least one of an inert gas and oxygen, to produce an intermediate layer consisting of at least one of $TiO_x$, $TiZrO_x$, $TiNbO_x$, $NbO_x$, $SnO_x$, $SnZnO_x$ and $ZnO_x$;

sputtering a Si, an Si:Al or its respective oxides or nitrides containing target, e.g. a Si, or a Si:Al target in semi-conductive, metallic or at least partially oxidized or nitrided ceramic state, like $SiO_2$, SiC or substoichimetric $SiO_x$ or $SiC_x$. These processes are performed in an reactive atmosphere containing at least one of nitrogen and oxygen which may comprise also an inert gas to produce a silicon inclusive layer; the silicon inclusive layer comprising or consisting of an oxidic, nitridic, or oxynitridic Si, or Si:Al inclusive layer (3', 5'), whereat the terms oxidic, nitridic or oxynitridic also comprise sub-stoichiometric compounds, e.g. from 80 to 100% of the usual atomic metal to non-metal rate, e.g. form $MeO_{2-0.4}$ to the stoichiometric $MeO_2$. As further examples of the silicon inclusive layer material, which can be used as the top layer of the low-E stack pure $Si_3N_4$, $SiO_2$, or respective doped or mixed material like $SiO_2$:Al, $Si_3N_4$:Al, $SiO_xN_y$:Al can be used.

An optionally $ZnO_{sub}$ inclusive seed layer can be produced by sputtering from a Zn, a $ZnO_x$ or a respective aluminum doped target in an inert gas or inert gas and oxygen containing atmosphere directly on the surface of the inner blocking layer; wherein a $ZnO_{sub}$, or a conductive aluminum doped $ZnO_{sub}$:Al layer which can be a thin oxide conductor (TOC) is deposited.

Respective analog process parameters can be applied to other target materials to deposit the seed layer.

Optionally the complete deposition sequence or parts of the sequence of the low-E stack can be repeated at least once. As for example, the once twice or several times repeated sequence(s) of the low E-stack may comprise at least one of the following sequences or respective deposition of sub stacks:

basic layer—silver inclusive layer—blocking layer;
seed layer—silver inclusive layer—blocking layer;
basic layer—seed layer—silver inclusive layer—blocking layer;
basic layer—optional seed layer—silver inclusive layer—blocking layer—optional seed layer;
blocking layer—intermediate layer—silicon inclusive layer;
the whole low E-layer sequence:
basic layer—silver inclusive layer—blocking layer—intermediate layer—top layer of the low-E stack which can be a silicon inclusive layer or
basic layer—seed layer which can be a zinc oxide inclusive layer—silver inclusive layer—blocking layer—intermediate layer—silicon inclusive layer.

Such layer sequences can be deposited consecutively without further different layers in between. Alternatively the deposition sequence basic layer—silver inclusive layer—blocking layer, the sequence basic layer—$ZnO_{sub}$ inclusive layer—silver inclusive layer—blocking layer, or the sequence silver inclusive layer—blocking layer alone can be repeated once or several times, either directly or with a further dielectric layer provided between respective silver-layer containing sub-stacks or between the substrate and the innermost silver inclusive layer. Sub-stacks here refer to layers from as mentioned deposition sequences. Alternatively, such or similar, e.g. Al-doped TOC layers can be used as seed layers directly on the substrate surface, followed directly by an as mentioned blocking layer or a silver inclusive layer. For further examples of exemplary layer sequences see Table 3 and FIG. 3A to 3N and respective description.

Target materials, e.g. for the blocking layer, the intermediate layer or the silicon inclusive layer, can be metallic like NiCr, Sn, SnZn, Ti, TiZr, Zn, Sn, SnZn, Nb, TiNb, or aluminum doped zinc (Zn:Al), semi-conductive like Si or conductive like aluminum doped silicicon (Si:Al), be a compound like respective oxides or doped silicon nitrides or oxides and their respective mixtures like oxynitrides, which may be stochiometric or sub-stoichiometric with reference to oxygen and/or nitrogen. Argon, neon or krypton can be used as an inert gas to sputter silver. The same or a different inert gas or a mixture thereof can be used to support sputtering of any dielectric layers like blocking layer, absorber layer stack or further dielectric layers, e.g. as may be used between the substrate and the low E-layer stack, as well as for the TM inclusive layer and the terminal DLCH-layer. However, due to process economy argon will be used in most cases. Aluminum doped refers to an aluminum content between 0.1 to 2 at % of the respective metallic ratio. The doped oxides can be approximately stochiometric or sub-stochiometric with an oxygen content between 80 to 99%, or 90 to 99% of the stochiometric value.

A further layer comprising or consisting of at least one of zinc oxide ($ZnO_x$, ZnO), aluminum doped zinc oxide ($ZnO_x$:Al, ZnO:Al), titanium oxide ($TiO_x$, $TiO_2$), zirconium oxide ($ZrO_x$, $ZrO_2$), niobium oxide ($NbO_x$, NbO, $NbO_2$, $Nb_2O_5$), tin oxide ($SnO_x$, SnO, $SnO_2$), $SiN_x$, SiN, $SiO_xN_y$, SiON, or a mixture thereof, in the following referred to as "further layer material", or a multitude of such layers having different chemical compositions can be sputter deposited between the substrate and the low E-layer stack. $MeO_x$, $SiN_x$ and $SiO_xN_y$, hereby stand for any sub-stoichiometric or stoichiometric compound. The targets comprising accordingly respective metallic or (sub)stoichiometric oxidic compounds of Zn, Zn:Al, Ti, Zr, Nb, Sn, Si, whereat silicon may be also sputtered from a (sub-)nitridic or (sub-)oxinitridic target.

Despite of the fact that herewith PVD sputter processes are referred too primarily to deposit the layers of the coating, e.g. the functional layer stack which can be a low-E layer stack or other layers and stacks as described above, below and in tables 1 and 2, it should be mentioned that CVD or plasma enhanced (PE) CVD processes can be applied to produce certain layers or all layers and the application is also directed to a coated article, independently from the respective deposition method, as will be pointed out in detail further below.

In a further embodiment to deposit the TM inclusive layer the process may comprise sputtering a $(Ti_a Zr_b Y_c Hf_d) O_x C_y$ target, or a $(Ti_a Zr_b Y_c Hf_d)$ target in a carbon gas containing sputter-atmosphere, wherein:

$$a+b+c+d=1,$$

$0.5 \leq a \leq 1$, $0 \leq b \leq 0.5$, $0 \leq c \leq 0.02$, $0 \leq d \leq 0.01$ and $0 \leq x \leq 2$, $0 \leq y \leq 1$, e.g with $0.5 \leq a \leq 0.9$, $0.1 \leq b \leq 0.5$, $0 \leq c \leq 0.02$, $0 \leq d \leq 0.01$.

Thereby further TM metals which are unavoidable due to the manufacturing process of the respective target, as e.g. Y, Hf, Ta, can be comprised within the target material up to about 2, or at least 1 atomic percent of the metal portion of the target material, also without being mentioned in the formula above. Such further TM metals can be found in respective proportion in the layer material also. Thereby a $(Ti_a Zr_b Y_c Hf_d) O_x C_y$ layer can be deposited having about the same metal coefficients a to d, but different carbon to oxygen ratio with $0 \leq x \leq 2$ and $1 \leq y \leq 6$.

With such a process step the sputter-atmosphere will usually comprise an inert gas, a carbon gas and optionally oxygen. C-inclusions, or C-doping, into the transition metal inclusive layer can be deposited in the sputter-process by sputtering the corresponding metallic, oxidic, carbidic or oxycarbidic target of the transition metal, co-sputter a metallic transition metal target with a carbidic, oxidic or oxicarbidic target, or sputter a transition metal inclusive target in a mixture of inert gas and carbon gas. Transition metal inclusive targets may be in metallic or partially metallic, partially oxidized, or in fully oxidized ceramic state as described above.

Despite of the fact that methane, ethane, propane, butane, ethylene, propylene, butylene, acetylene, methylacetylene, as well as other hydrocarbons, or hydrocarbon derivatives, or just any C-containing gases or a mixture thereof could be used as carbon gas for depositing the TM inclusive layer, methane proved to be applicable for a wide range of process parameters.

For sputter processes a direct current (DC)-supply, a radio-frequency(RF)-supply, a pulsed DC-supply, an MF-AC supply, or a HIPIMS-supply or a combination of such supplies can be applied. To deposit usual oxidic or other non-conductive targets RF- or pulsed DC-supplies, e.g. a high ionized planar magnetron sputtering (HIPIMS) supplies, can be applied to the sputter target. The same refers to target materials prone to surface poisoning due to a process atmosphere containing reactive gases.

Deposition of the TM inclusive layer may comprise adjustment of the carbon gas flow in the sputter atmosphere to deposit a $TMO_x C_y$ layer having a molar metal to carbon ratio of $1.0 \leq Me/C \leq 0.01$, e.g. $0.5 \leq Me/C \leq 0.01$, or $Me/C = 0.07 \pm 0.03$, at least at the surface in direct contact with the DLCH layer. Thereby the flow of the carbon gas can be kept equal or be ramped up during the sputtering of the respective target.

Carbon content in the TM inclusive layer could be adjusted by the ratio of the carbon containing gas, in the following "carbon gas", to the inert gas, e.g. $r_{CH4} = CH_4/(Ar + CH_4)$. Whereas due to the low sticking coefficient of carbon to TM-metals in comparison to oxygen, no carbon can be implemented into the layer with a low $r_{CH4}$ until about 4 vol %. Within a medium $r_{CH4}$ region from 5 to 45 vol % titanium and/or zirconium comprising carbides are formed. From thereon, that is $r_{CH4} > 45\%$, the carbide formation declines in favor of an a-C:TM or ta-C:TM containing DLCH formation wherein the TM metal content of carbides and metal-carbon will comprise also target materials, e.g. metals or silicon, of minor concentrations. The terms a-C:TM and ta-C:TM hereby stand for TM metal containing DLC, whereat ta-C:TM has a higher sp³ proportion in analogy to the sp³ hybridization of deposited ta-C:H layers, see below. Due to process limitations the highest $r_{CH4}$-ratio applied was about 60%. It should be mentioned that respective carbide or a-C:TiZr films could be also seen on the respective target surface with increasing $r_{CH4}$-ratio, so that compound formation seems to take place at the target side for an essential amount, whereby respective compounds are sputtered away in the following to form the TM inclusive layer. Respective $r_{CH4}$ numbers of the present paragraph refer to sputtering processes with oxidic targets. Man of the art will understand that the same, lower or higher $r_{CH4}$ numbers can be chosen when using metallic targets and optionally oxygen as second reactive gas to produce a respective TM inclusive layer comprising carbon.

In common the parameters as shown in Table 2 could be used within the sputter compartment of an industrial inline system.

Thereby an TM inclusive layer having thickness of 0.5 to 20 nm could be applied, which gave good results in mechanical testing with a DLCH-top layer as well as after tempering with a TM inclusive layer as an example. For reasons of process economy and minimal optical interference a layer thickness from 0.5 to 10 nm was applied for the TM inclusive layer, e.g. $5.5 \pm 0.5$ nm.

In a further embodiment depositing of the DLCH-layer may comprise exposing the carbon containing surface of the TM inclusive layer to a plasma-enhanced chemical vapour (PECVD) process using a mixture of a carbonaceous gas and an inert gas. Growth and layer properties in the DLCH-layer can be adjusted by the ratio of the carbonaceous gas to the inert gas, e.g. $r_{C2H2} = C_2H_2/(Ar + C_2H_2)$ with 10 vol % $\leq r_{C2H2} \leq 60$ vol %. By using such high $r_{C2H2}$ ratios respective high carbon content could be attained in the TM inclusive layer to ensure a good crosslinking and corresponding mechanical properties of the following DLCH-layer.

Despite of the fact that methane, ethane, propane, butane, ethylene, propylene, butylene, acetylene, methylacetylene, as well as other hydrocarbons, or hydrocarbon derivatives, or just C-containing gases or a mixture thereof could be used as carbonaceous gas for depositing the DLCH-layer, acetylene ($C_2H_2$) proved to be applicable for a wide range of process parameters. Process pressure range could be set from $5 \times 10^{-4}$ to $2 \times 10^{-2}$ mbar.

The PECVD process may be an inductively coupled plasma process (ICPP) providing an ion current density from 0.01 to 3.5 mA/cm² to the surface. The plasma could be coupled from at least one closed plasma source chamber into the process compartment by at least one plasma window in parallel to the substrate surface. The plasma source chamber may comprise a planar ICP-electrode. Thereby a plasma density in the process compartment could be set from $10^9$ to $10^{12}$ cm⁻³, ion energy from 10 to 70 eV, e.g. to 15 eV at $5 \times 10^{-3}$ mbar. 13.56 MHz industrial generators were used as supply. Comparative measurements with diatomic process gases ($O_2$, $N_2$) only within the process chamber gave a dissociation degree of up to 90%. The plasma produced was a quasi neutral plasma. The plasma has been coupled from at least one plasma source chamber comprising an ICP-electrode into the process space by at least one plasma window in parallel to the substrate surface. However, configurations using a multitude of 2, 3, 4, 5, 6 or even more sources would be feasible. As for example within an ICP compartment of an industrial inline system three ICP-plasma sources arranged linearly across the substrate width have been used and driven with an ICP-power of 0.3-5 W/cm$^2$ per coupling window area, that would be approximately between 1-17 kW per meter width of glass substrate. Thereby the width of the glass substrate refers approximately to the length of the source window(s) having a respective source width usually between 10 and 50 cm. Details on respective process parameters can be found with Table 2, however the area of the respective coupling window per source may vary from 1500 to 4500 cm$^2$, e.g. 2500 to 3500 cm$^2$, depending of the ICP-power per area emitted by the respective source(s) and the distance of the window(s) to the substrate surface.

Process parameters could be adjusted to produce a layer thickness from 5 to 20 nm, e.g. from 8 to 12 nm for optimal process economy and layer performance.

A compilation of process parameters for exemplary single layers and layer stacks of inventive coatings are shown in Table 2. The table in the footnotes comprises also essential features of the industrial inline coating system as used. Further experiments were also made in smaller however comparable laboratory systems to optimize single layers or display certain features of the adhesion or DLCH layer.

To produce a scratch resistant low-E end-product, e.g. a toughened safety glass, the low-E intermediate product with outermost DLCH layers can then be tempered in an oxygen containing tempering atmosphere, wherein a tempering temperature from 600 to 750° C., e.g. from 650 to 700° C. Such processes could be performed in ambient air. Thereby the DLCH top layer could be burned completely and at the same time the TM inclusive layer be transformed from a metal oxy-carbide, an a-C:Me or a respective mixed layer to an essentially metal oxide layer. To optimize hardening of the end-products surface a defined range relatively small thickness range from 2 to 30 nm, e.g from 8 to 12 nm should be used, as this layer does not only serve as an intermediate protection for handling, but also as a fuel to burn away the carbon content and initialize the phase transformation of the TM inclusive layer from a metal carbon to an essentially oxidic top layer of an "end-product", e.g. from $TMO_xC_y$, like $TiO_xC_y$, $TiNbO_xC_y$, $TiZrO_xC_y$, $NbO_xC_y$, $ZrO_xC_y$, $NbZrO_xCy$ $TiZrO_xC_y$ or $(Ti_aZr_bY_cHf_d)O_xC_y$ to $TMO_x$, like $TiO_x$, $TiNbO_x$, $TiZrO_x$, $NbO_x$, $ZrO_x$, $NbZrO_x$, $TiZrO_x$ or $(Ti_aZr_bY_cHf_d)O_x$, whereby both the TM inclusive layer of the intermediate-product and the top layer of the end-product show an amorphous layer structure.

Other options to temper the intermediate product if toughening is not required are:
  heating in air between 390° up to 500°
  etching in an oxygen containing plasma
  UV-illumination, e.g. in an oxygen containing atmosphere, e.g. air With all other options due to a respective combination of temperature and duration of the respective treatment, removing of the DLCH layer and phase transition of the carbon containing TM inclusive layer can be performed partially only or completely up to the respective needs;

Despite of the fact that the outermost DLCH-layer on top of the multilayer system will be burnt away for many applications, like building services engineering and automotive applications as an example, for some applications, e.g. in building technology and architectural design a combination of a very thin TM inclusive layer and a very thin DLCH layer, both together within a thickness-range from 1 to 30 nm, are practicable to minimize influence to optical properties of the coated glass and use such low-E "intermediate products" in place of high temperature tempered end-products. Such products show an even higher resistance against mechanical surface strain than glasses with high temperature hardened $TMO_x$. surface. Therewith annealing at lower temperatures below 450° C., e.g. from 50° to 350° C. can be still performed without burning of the DLCH layer.

The invention also refers to a coated article comprising:
  a glass substrate having a surface and in corresponding sequence coming from the surface
  a low-E layer stack comprising at least one metallic silver inclusive layer sandwiched between two dielectric layers and in direct contact with at least one or both of the dielectric layers;
  a TM inclusive layer comprising carbon in a molar amount which at least at the final surface of the TM inclusive layer equals at least to the molar amount of TM.
  a hydrogen containing DLC (DLCH) layer which can be provided in direct contact to the TM inclusive layer as an outermost layer of the coating.

As an example, the metallic silver inclusive layer may be essentially a silver layer. The outer dielectric layer of the sandwich will comprise a sub-stoichiometric oxide, e.g. within the blocking layer. Thereby a metallic layer may be provided in direct contact to the silver inclusive layer, and/or a graduated or stepwise growth of the oxygen content from the inner surface towards the outer surface of the blocking layer may be applied, e.g. by an oxygen gradient during the deposition process.

The dielectric layers may comprise at least one of a basic layer and an intermediate layer between the substrate and the respective silver inclusive layer, the basic layer and the intermediate layer being in direct contact to the silver inclusive layer or an optional seed layer, sandwiched between the basic layer and the silver inclusive layer and in direct contact to both whereat the seed layer may be doped with aluminum.

Thereby the basic layer may comprises or consists of an oxide, a nitride, or an oxynitride from at least one of Ti, TiZr, Zr, TiNb, Nb, Si, Si:Al, Sn, SnZn and Zn and the optional seed layer may comprise or consists of an sub-stoichiometric zinc oxide ($ZnO_{sub}$) or a sub-stoichiometric aluminum doped zinc oxide ($ZnO_{sub}$:Al). Despite of the fact that a ZnO-comprising seed layer may be applied optionally only in most cases, it has to be applied to a basic or intermediate layer or respective layer stack as far as a silicon containing layer is used within the respective layer (stack) to avoid a direct contact between a silicon containing layer and the silver inclusive layer, which might result in poor adhesion.

The dielectric layers may also comprise at least one blocking layer between a silver inclusive layer and the TM inclusive layer, whereat the blocking layer can be in direct contact to the silver inclusive layer and comprise or consist of at least one of metallic titanium (Ti), metallic nickel-chrome alloy (NiCr), and respective sub-stoichiometric oxides $TiO_{sub}$, and $NiCrO_{sub}$.

In a further embodiment an absorber layer stack comprising at least one chromium nitride inclusive layer sandwiched and in direct contact between two silicon nitride inclusive layers can be arranged between the low-E layer stack and the TM inclusive layer;

As an example, the chromium nitride inclusive layer and the two silicon nitride inclusive layers may be respective chromium nitride and silicon nitride layers.

In a further embodiment at least one further layer comprising at least one of zinc oxide (ZnO), aluminum doped zinc oxide (ZnO:Al), titanium oxide ($TiO_2$), zirconium oxide (ZrO2), niobium oxide (NbO, $NbO_2$, $Nb_2O_5$), tin oxide ($SnO_2$), silicon nitride ($Si_3N_4$), silicon oxynitride ($SiO_xN_y$) or a mixture thereof, or a multitude of such layers having different chemical compositions may be arranged between the substrate and the low E-layer stack, e.g. between the substrate and the base layer stack, between separate layers of the base layer stack, or between the basic layer and the silver inclusive layer.

In a further embodiment the low-E layer stack comprises at least two metallic silver layers, each sandwiched between a zinc oxide layer on the substrate side of the silver layer and a blocking layer on the outer side of the silver layer, each silver layer being in direct contact with the respective zinc oxide and blocking layer.

In a further embodiment the TM inclusive layer before tempering essentially consist of a carbide or an oxycarbide of at least one of the following TM metals: Ti, Zr, Sn, Zn, Nb, Hf, Y, Cr, Mn, Fe, Co, Ni, Mo, V, Ta, W, and further carbon and optionally hydrogen, both in a bound condition and/or in free form, e.g. comprising also a-C:TM or a-C(H):TM phases.

As an example, the TM inclusive layer may consist of at least one of $TiO_xC_y$, $TiNbO_xC_y$, $TiZrO_xC_y$, $NbO_xC_y$, $ZrO_xC_y$, $NbZrO_xC_y$, wherein $0 \leq x \leq 2$ and $1 \leq y \leq 6$.

In a further embodiment the TM inclusive layer can be a $(Ti_aZr_bY_cHf_d) O_x C_y$ layer, wherein $a+b+c+d=1$, $0.5 \leq a \leq 1$, $0 \leq b \leq 0.5$, $0 \leq c \leq 0.02$, $0 \leq d \leq 0.01$ and
$1.2 \leq x \leq 2.5$ and $1 < y \leq 6$.

Best results for mechanical and optical properties of the intermediate-product could be achieved in the following ranges:

$0.01 \leq c \leq 0.02$, $0.25 \leq b \leq 0.35$ and $0 \leq x \leq 2.1$ and $2 \leq y \leq 5$ It should be mentioned that the formula refers to the stoichiometric overall relations in the layer and not to an actual compound which can be a semi-crystalline or completely amorphous mixture of e.g., $TiO_x$, $ZrO_x$, $ZrTiO_x$, respective oxycarbides, carbides and/or amorphous carbon a-C:TiZr or ta-C:TiZr which may comprise also some hydrogen not represented in the respective formula. Further TM metals unavoidable due to the manufacturing process of the respective target may be comprised also without being mentioned in the respective formula as mentioned with the description of the deposition process of TM inclusive layers.

As for example the TM inclusive layer may be an amorphous layer essentially consisting of TM metal and carbon with a ratio $r_C$=Me:C, and $1 \leq r_C$, When the TM metal comprises Ti+Zr or Ti+Zr+Y as main metallic element, having a percentage of >1 mol %, e.g. ≥2 mol % of the metal percentage, Hf may be used as a doping element with a percentage<2 at % or ≤1 at %.

Therewith the composition will usually have a molar excess of carbon with reference to the metal oxide. Any TM inclusive layers, due to the deposition process comprising a carbon-hydrogen containing gas, and respective carbon excess may comprise at least one of the following: carbon to carbon bonds in $sp^2$ and/or $sp^3$ hybridization, carbon to hydrogen bonds, free carbon and free hydrogen. This refers to coatings as deposited before eventually subsequent annealing or tempering processes. Such coatings can be deposited preferably in an amorphous structure which may also foster the formation of amorphous oxides during an optionally tempering procedure. Both structures being less prone to mechanical and corrosive stress than crystalline structures produced by state of the art processes using e.g. a lower carbon gas to inert gas ratio, whereas the present ratio $r_{Cgas}$=carbon gas/(carbon gas+inert gas), can be e.g. $10\% \leq r_C \leq 60\%$ and especially $20\% \leq r_C \leq 55$ vol % which is comparable to mole %.

During an optional subsequent tempering the carbon within the TM inclusive layer will in most cases be burnt to a great part or even completely, so that "y" equals to zero. Best compositions and ranges of the metal portion will be about the same as mentioned with concentrations before tempering above, whereas C is burned completely or to a great part.

Therefore after tempering the TM inclusive layer can be a $TMO_xC_y$, e.g a $TiO_x$, $TiNbO_x$, $TiZrO_x$, $NbO_x$, $ZrO_x$, $NbZrO_x$, or a $(Ti_aZr_bY_cHf_d) O_x C_y$ layer, wherein $a+b+c+d=1$, $0.5 \leq a \leq 1$, $0 \leq b \leq 0.5$, $0 \leq c \leq 0.02$, $0 \leq d \leq 0.01$ and
$1.2 \leq x \leq 2.5$ and $0 \leq y \leq 0.4$.

The hydrogen containing DLCH layer can be provided in direct contact to the TM inclusive layer as an outermost layer of the coating and can be an organic layer consisting of covalently bound carbon and hydrogen. Which means that essentially no other atoms can be found in the layer, and carbon atoms are bound covalently to each other and to the hydrogen atoms. The DLCH layer can be a ta-C:H layer. Such deposited ta-C:H layers have a $sp^3$ proportion of about 40 to 70%, e.g. 50 to 60%, or from 51 to 55%.

DLCH layers as deposited according to the present invention could be characterized by at least one of the following parameters:

a water contact angle (WCA) from 52° to 54°;
an average surface roughness as measured with atomic force microscopy (AFM) is <<10 nm, e.g. 6 nm, e.g. 1±0.5 nm;
a refractive index n of the DLCH layer is from 1.69 to 1.73 and the coefficient of extinction is from 0.3 to $1.0 \times 10^{-2}$, both defined at 900 nm;
a mass density p of the DLCH layer is from 1.2 to 2.2 g/cm³.
Hardness of DLCH layer, measured by nano-indentation, is from 1 to 10 GPa, e.g from 3.5-10 GPa, or from 6-9 GPa. Measurement has been made with a nano-indenter, stylus force 15 μN, with test layer of 96 nm thickness.

Further properties like optical properties between 300 and 500 nm, C—H bonding as analysed with FTIR-Raman analysis and respective derived $sp^3/sp^2$ content, as well as hardness measurements will be discussed below at the hand of figures and specific examples of the invention.

It should be mentioned that a combination of two or more than two embodiments or examples of the inventive process or the inventive article as discussed in description, claims or figures are considered to be disclosed as part of the invention unless being in contradiction.

Figure 2:
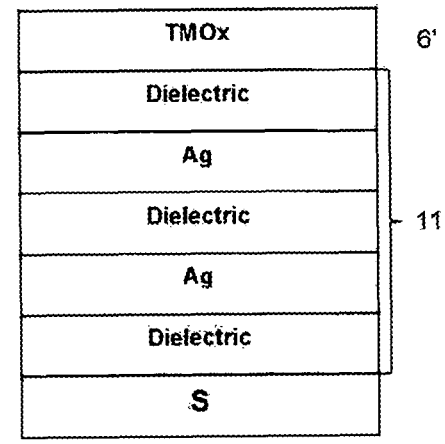
Figure 2:
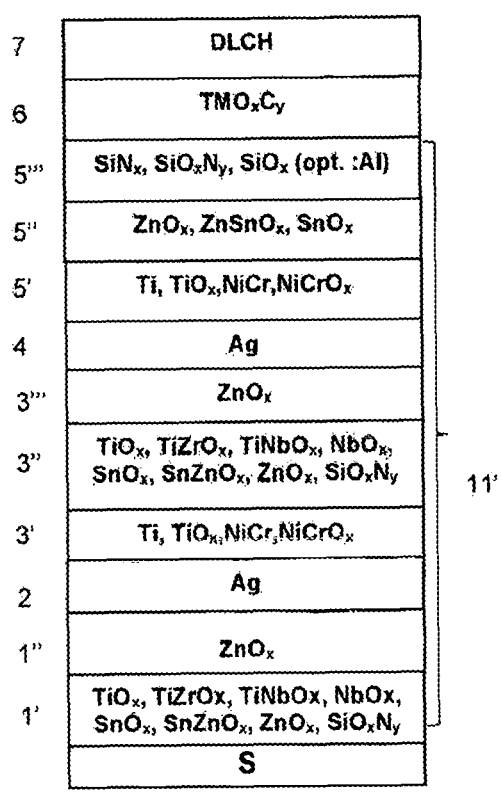
Figure 3:
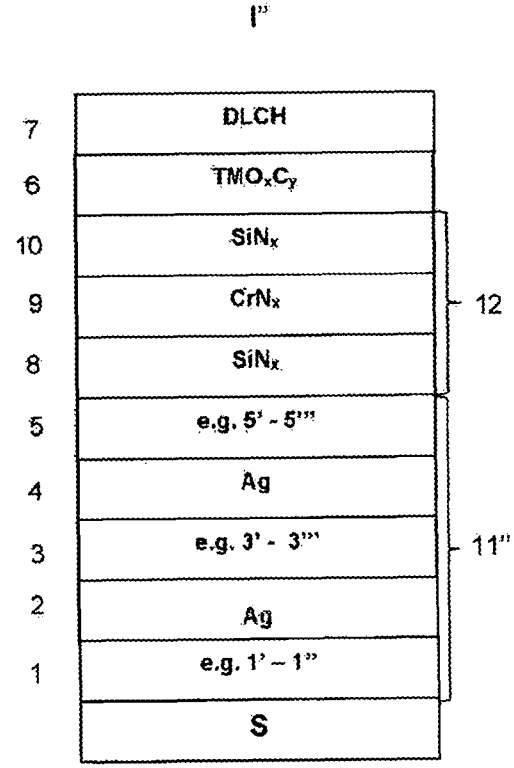
Figure 4:
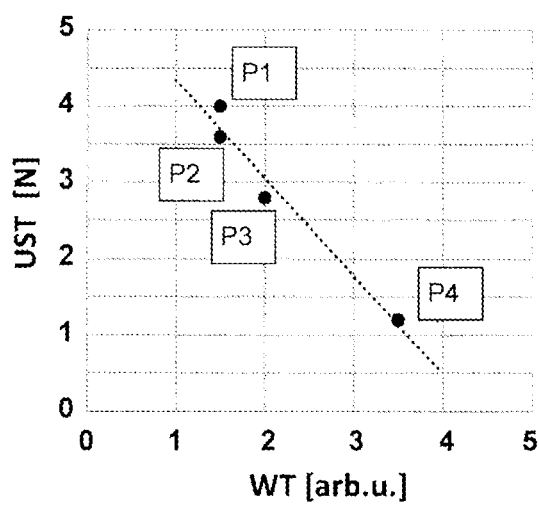
Figure 5:
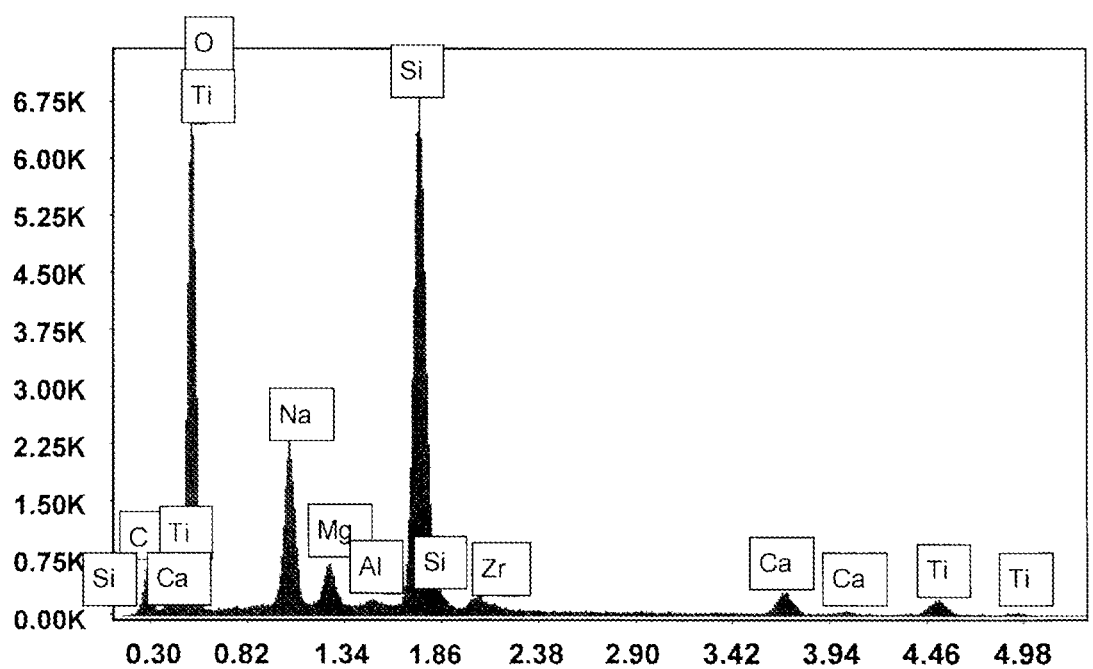
Figure 6:
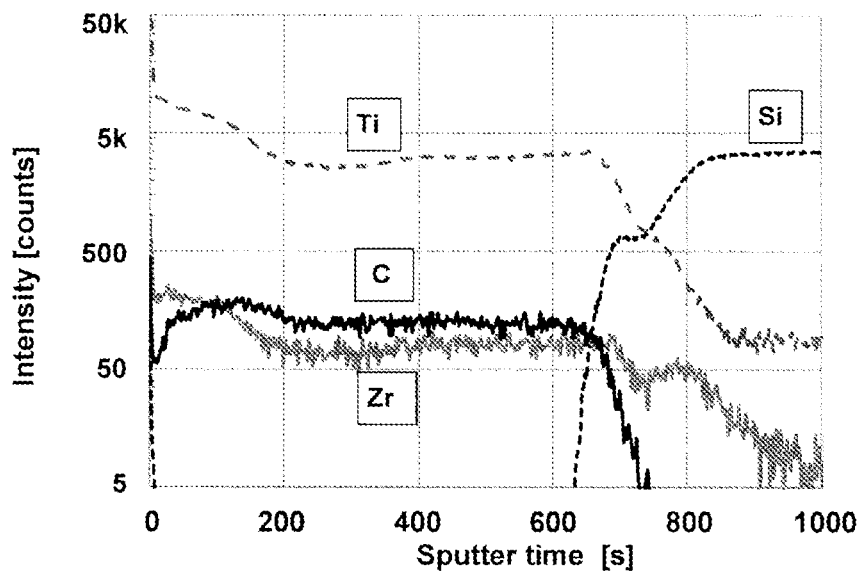
Figure 7A:
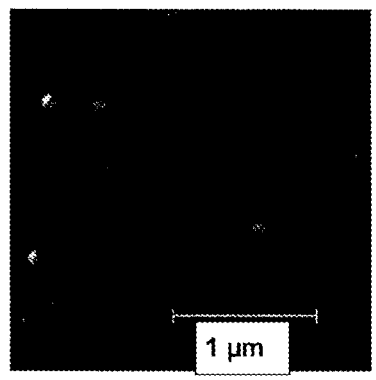
Figure 7B:
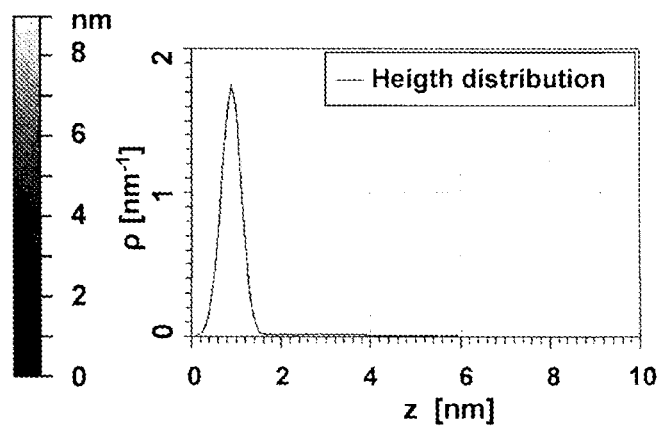
Figure 8A:
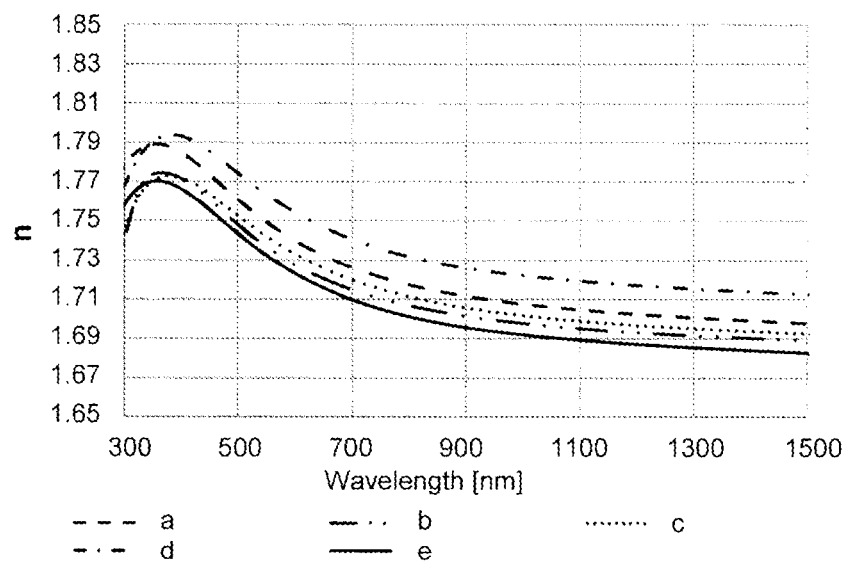
Figure 8B:
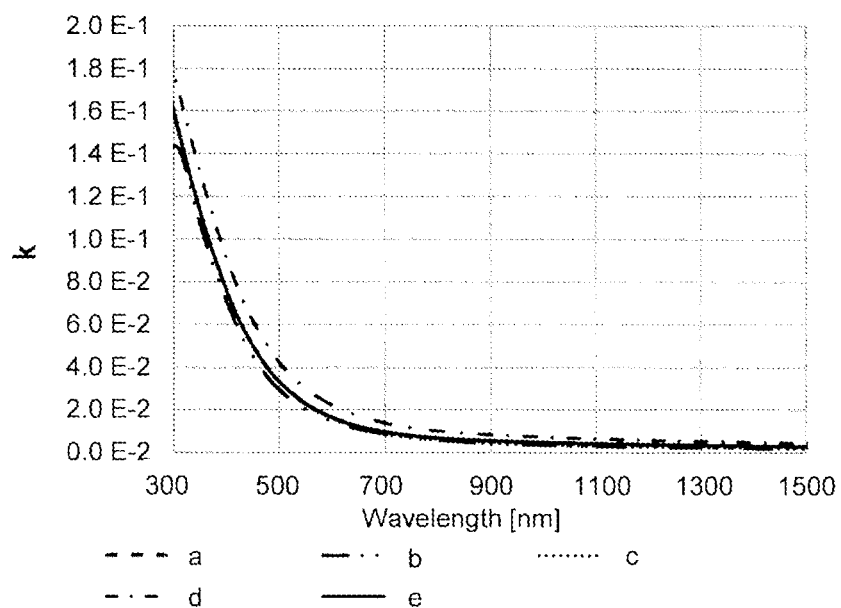
Figure 9:
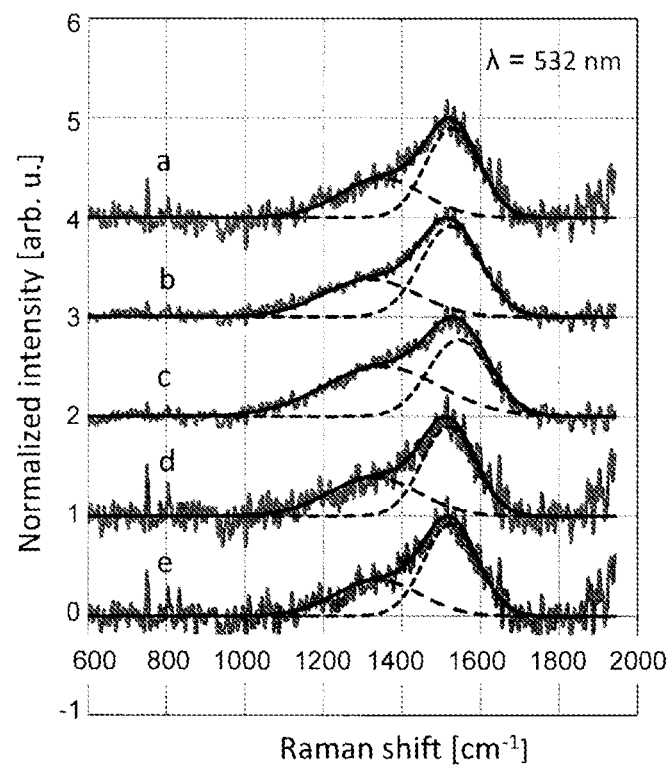
Figure 10A:
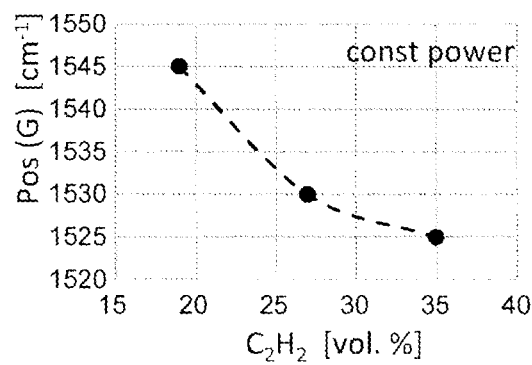
Figure 10B:
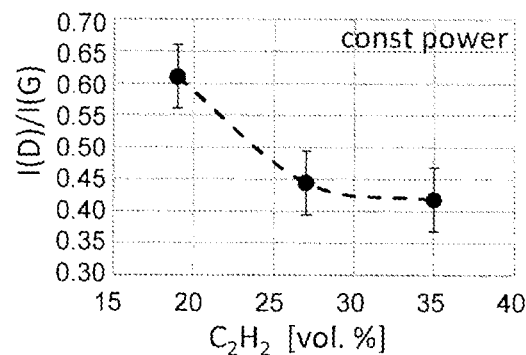
Figure 10C:
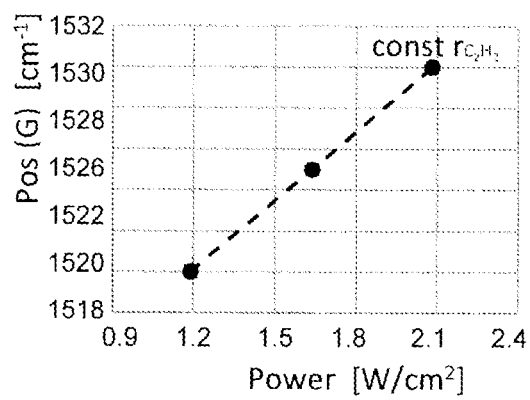
Figure 11A:
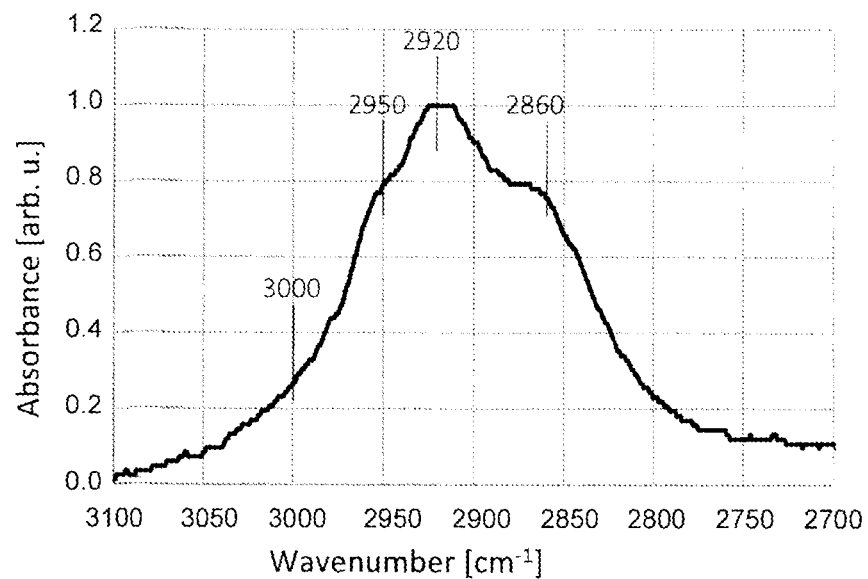
Figure 12:
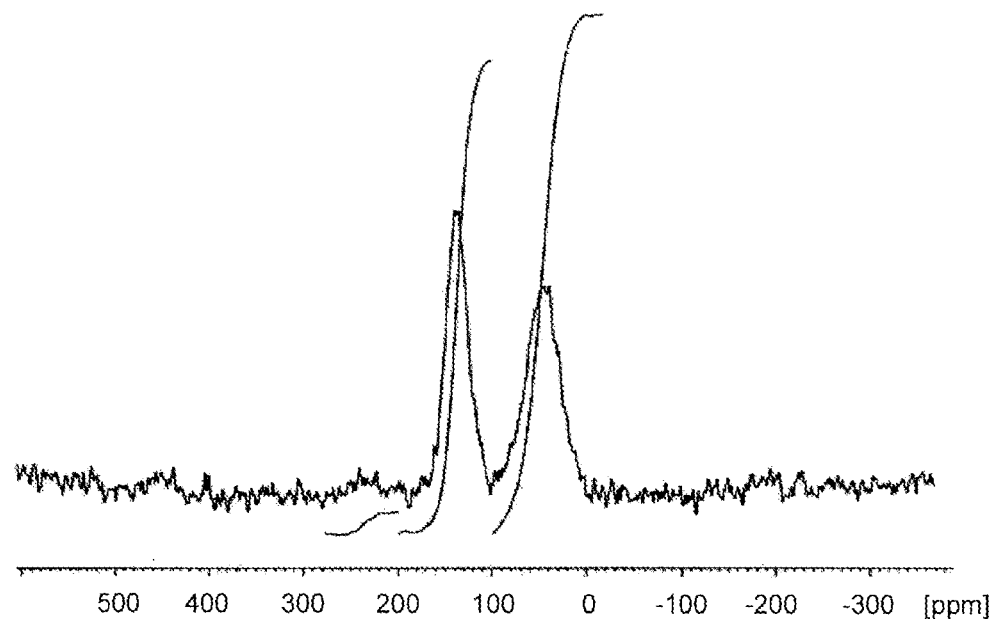
Figure 13:
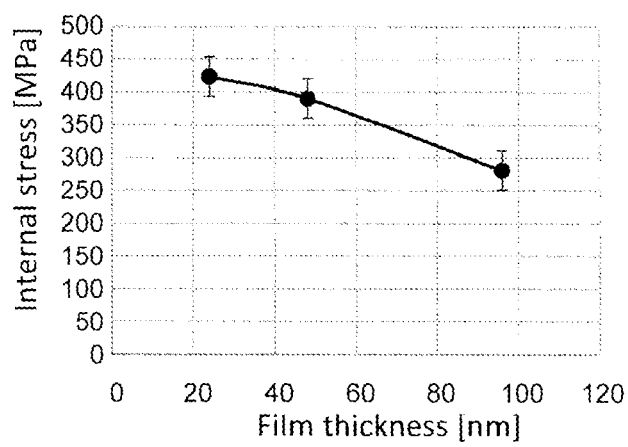
Figure 14:
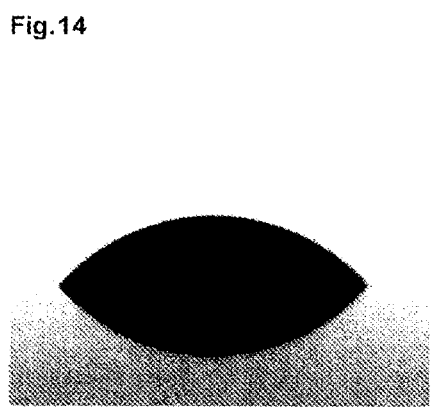

The invention shall now be further exemplified with the help of figures and further tables. The figures show:

FIG. 1 Schematically and simplified an embodiment of an inventive glass article before and after tempering;

FIG. 2 An embodiment of an inventive article;

FIG. 3 A further embodiment of an inventive article;

FIG. 3A-N Examples of embodiments of the basic layer;

FIG. 4 Mechanical properties of an inventive article;

FIG. 5 An EDX spectroscopy plot of an TM inclusive layer;

FIG. 6 A TOF-SIMS depth profile of an TM inclusive layer;

FIG. 7A A surface area scan of AFM measurements on DLCH;

FIG. 7B A height distribution scan of an AFM measurement on DLCH;

FIG. 8A Refractive indices n of DLCH top layers;

FIG. 8B Coefficients of extinction of DLCH top layers;

FIG. 9 Raman spectra of DLCH top layers;

FIGS. 10A/B Pos(G) and I(D)/I(G) with variable acetylene percentage;

FIGS. 10C/D Pos(G) and I(D)/I(G) with variable ICP power;

FIGS. 11A/B ATR FTIR measurements stretching and bending C—H modes;

FIG. 12 A $^{13}C$ NMR spectrum of a DLCH layer;

FIG. 13 A compressive stress versus DLCH thickness diagram;

FIG. 14 A water droplet on a DLCH surface.

FIG. 1 shows a basic scheme of an inventive article before and after tempering whereat on a glass substrate a low-E stack 11 is deposited comprising two silver layers 2, 3 and three dielectric layers 1, 2, 3. It should be mentioned that in an even more economical version a low-E stack with one silver layer 2 and two dielectric layers 1,2 only will also work but will not reach the same IR-blocking values as stacks comprising two or more silver layers of comparable dimensions. Following to the low-E stack 11 a TM including layer 6 with a high carbon content and a DLCH layer 7 follows for a so called intermediate product I, in this case a surface protected low-E glass. During an optional tempering process at 650 to 700° C. performed with or during finishing to produce the so called end-product II, a toughened safety glass, the DLCH-coating is burnt away and at the same time the mixed carbide containing amorphous structure 6 of the so called TM inclusive layer is transformed to a still amorphous, essentially oxidic structure 6' as discussed in detail above. The oxidic structure 6' having a better wear resistant with scratch and washing tests as can be seen with FIG. 4, see also respective description below. The low-E stack 11, protected below layers 6 and 7 respectively below layer 6' after tempering essentially remains unchanged.

FIG. 2 and FIG. 3 show further inventive embodiments of intermediate products I' and I" comprising dielectric layers 1, 3, 5 of a defined material within the low-E stacks 11' and 11", namely one base layer 1' which can be in direct contact to the surface of the substrate S and the following silver layer 2 or as shown with an innermost seed layer 1", which may be dope with aluminum. The base layer 1' and two intermediate layers 3", 5" may consist of $TiO_x$, $TiZrOx$, $TiNbOx$, $NbOx$, $SnOx$, $SnZnOx$, $SiN$, $SiON$ or a mixture thereof, each followed either by a seed layer 1''', 3''' consisting of a sub-stoichiometric zinc oxide ($ZnO_{sub}$) or a sub-stoichiometric aluminum doped zinc oxide ($ZnO_{sub}$:Al) which is followed by two silver layers 2, 4, or in the case of the outermost intermediate layer 5", the top layer 5''' of the low-E stack, which is a silicon inclusive layer 5''', the latter may follow either directly on the zinc oxide, tin oxide or $ZnSnO_x$, inclusive intermediate layer 5" as shown, or on an intermediate layer stack comprising a final zinc oxide inclusive layer to contact the silicon inclusive layer 5'''. Zinc oxide inclusive layers may be doped with Aluminum in both cases. Seed layers are optional but should be used when a silicon containing material is used for the base layer or the intermediate layer. On the outer surface of every silver or silver inclusive layer, sandwiched between the silver layer 2, 4 and following intermediate layer 3" and 5", a respective blocking layer 3', 5' of respective metallic and/or sub-stoichiometric oxidic material is deposited in direct contact to layers 2, 4 to protect silver from oxidation. With FIG. 2 the TM inclusive layer 6, which on its part directly supports the DLCH layer 7, follows in direct contact to the top layer of the low-E stack. With FIG. 3 an absorber layer stack 12 comprising at least one chromium nitride inclusive layer 9 sandwiched and in direct contact between two silicon nitride inclusive layers 8, 10 can be arranged between the low-E layer stack 11" and the TM inclusive layer 6. Further, e.g., oxide and/or nitride inclusive layer may be provided instead or between the low-E stacks 11, 11', 11" and absorber layer 12 stack or between the latter and the TM inclusive layer 6.

Further examples of layer sequences which can be verified within the low-E stack are shown in Table 3, whereby column 3A to 3C show stacks with one silver layer 2, whereas in column 3D an example for a two silver layer 2, 4 stack is shown, which could be extended in analogy to three, four or more silver layer stacks. Therefrom it can be seen that absorber layer stacks 12, sandwiched between or comprising at least one intermediate layer 3", 5" in direct contact at an inner or/and outer surface of the absorber layer stack 12 can be inserted at different levels of the low-E stack 11, e.g. between the blocking layer 3' and the silicon inclusive layer 5''', which is the top layer 5''' of the low-E stack, between the basic layer 1' and the seed layer 1", or between a blocking layer 3' and a seed layer 3'''. Layers in bold boxes are optional for the function of the respective low-E stack example and can be omitted, replaced or accomplished by other layers. Layers below or above empty cells have to be seen as neighboring layers.

FIG. 3A to 3N show further examples of base layer stacks, which can be applied on a glass substrate S according to the present invention. Therewith only examples comprising absorber layers consisting of a $Si_3N_4/CrN_x/Si_3N_4$ stack are shown, however other silicon inclusive layers as disclosed with the present description can be used too. It should be mentioned that basic layer stacks as shown are only examples which can be varied to a large extent by combining such basic layer stacks or introducing further layers of a basic layer material or of a further layer material as defined above between the substrate and the basic layer stack, between single layers of the basic layer stack, or between the basic layer stack and the following seed layer.

Table 1 shows exemplarily function, thickness d and composition of some of the as mentioned layer material which could be used for inventive articles.

With FIG. 4 results of a universal scratch test (UST) and a washing test (WT) on inventive articles I before tempering were combined and set into relation as surprisingly an essentially linear relation could be seen between the two tests on such coated articles, whereby the easier to perform washing test could replace the more elaborate universal scratch test in a production environment. P1 to P4 refer to inventive coatings, whereas state of the art coatings without an a-CH-protective layer delaminate with the UST at loads in the range from 0.5 to 0.7 N.

Universal scratch test (UST) of the as deposited layer stacks has been performed with Erichsen scratch hardness tester, where tip is of van Laar (⌀0.5 mm) type, force can be increased from 0.1 N-10 N. Visible inspection under strong LED lamp. The maximum load value, under which coating still doesn't show any visible damage, defines its scratch-resistance.

Washing test has been performed by nylon brush of 454 g in deionized water, with a total amount of 300 runs and speed 37 cycles/min, control the sample on the subject of scratches under LED lamp. No scratches correspond to WT mark equal 1, with occasionally increasing amount of visible scratches the WT mark increases.

An energy-dispersive X-ray (EDX) spectroscopy plot of an TM inclusive layer, d=90 nm deposited on a float glass is shown in FIG. 5. The spectrum has been taken at 10 keV. The respective data are collected in Table 5. From that data a Ti/Zr atomic ratio of about 83/17 and a Me/C atomic ratio of about 0.22 could be deducted, whereby Me=Ti+Zr. Other metals as well as Si and an essential amount of the oxygen peak are assigned to the testing glass.

A time of flight secondary ion mass spectrometry (TOF-SIMS) depth profile from the same layer is displayed in FIG. 6. Elements like Si from the glass substrate, and C, Ti, Zr from the TM inclusive layer are displayed. The $TiZrO_xC_y$ layer was a homogeneous $TiZrO_xC_y$ layer essentially without C-gradient. Similar homogeneous layers have been proved to be successful in many applications. The depth profile has been taken with $Cs^+$ (1 kV) and $Bi^+$ (25 kV) ions measured in positive polarity on a surface area of 100×100 $\mu m^2$.

In the following some testing results with reference to DLCH layers on top of coated articles before tempering II (intermediate products) according to the present invention are discussed. The DLCH layers 7 having been deposited by an ICP-process as described above and in Table 4.

FIG. 7A shows a surface area scan of an atomic force measurements (AFM) of a DLCH layer of 24 nm thickness, with very small nodules randomly distributed over the surface having a diameter in the sub-μm range, e.g. having a diameter of about 100 nm and 1 nm height. A one μm dimension line can be seen inserted as a lateral x, y-scale, the grey-value bar on the right side serves as a basis to determine height (z-value) of respectively toned sub-areas. FIG. 7B shows a statistical height distribution over the same 2.5 μm×2.5 μm area, and evidences an average height of about 1 nm, also the highest nodules were far below 10 nm in height, about 6 nm to the maximum with a percentage of 99.9% within the range between zero and two nm.

Therewith an extremely smooth surface of the DLCH layer 7 is shown.

FIG. 8 show optical properties of DLCH coatings from samples "a" to "e", as deposited according to parameters given in Table 4. FIG. 8A shows the index of refraction n and FIG. 8B the extinction coefficient k, both between 300 and 1500 nm. In the IR region between 700 and 1500 nm n could be adjusted between 1.75 and 1.68, whereas k was always below $2 \times 10^{-2}$ respectively below $1 \times 10^{-2}$ for $\lambda \geq 900$ nm.

For the same test coatings samples "a" to "e" also Raman spectra were taken at an excitation wavelength of 532 nm and fitted with 2 Gaussian peaks (D and G) after background subtraction and normalizing of the date. Full width half maximum (FWHM) and intensity (I) numbers of both peaks calculated from the data were collected in Table 4, as were intensity relation I(D)/I(G) and Position of peak G. Respective curves are displayed in FIG. 9, "a" to "e".

From the same data numbers for FIG. 10A to C were taken. FIG. 10A and FIG. 10B show variation of Position (G) respectively of relation of peak intensities I(D)/I(G) when acetylene percentage in the process atmosphere was varied from 19 to 35%, samples numbers "a" to "c". Inert gas as used was Argon, the ICP-power was fixed at 7 kW per source, that is 21 kW for the three sources of the source configuration as used.

Figure 10D:
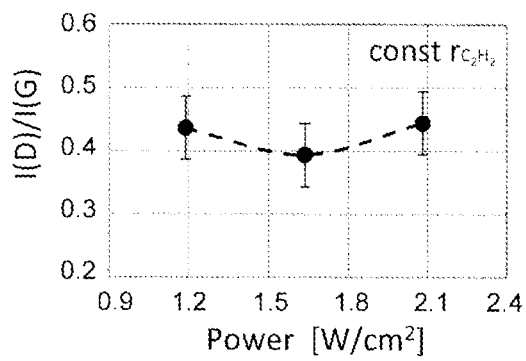

FIG. 10C and FIG. 10D show variation of Pos(G) respectively of relation I(D)/I(D) when the ICP-power range in the process atmosphere was varied from 4 to 7 kW, sample numbers "d", "e" and "a". Inert gas as used was Argon, the acetylene range in the process atmosphere was fixed at 27 mol %.

Figure 11B:
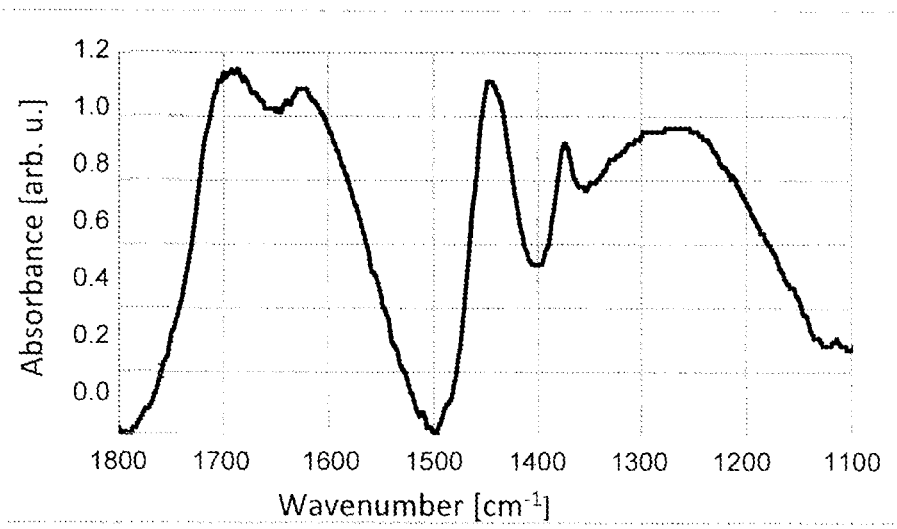

Thereby Position (G) variations could be seen from 1520 to 1545 $cm^{-1}$, whereas variation of peak intensities I(D)/I(G) varied from 0.39 to 0.61±0.05. With typical production conditions at Position (G) 1530 $cm^{-1}$, at an excitation wavelength of 532 nm a comparison with a state of the art correlation diagram, showing DLC phases at different Pos $(G)/\lambda_{excit}$ positions, was made which fitted well to a ta-C:H phase of the DLCH. The diagram was from A.C. Ferrari and J. Robertson as published in Phil Trans. R. Soc. Lond. A (2004), FIG. 11.

For estimation of the hydrogen content from Pos(G) and I(D)/I(G) a further diagram of the same authors has been used which has been published in Physical Review B 72, 085401 (2005), FIG. 5. Thereby a hydrogen content of 15 to 35% could be estimated for DLCH coatings on top of an inventive "intermediate product".

By similar correlating of respective Raman data to state of the art investigations a hardness range from about 100 to 250 GPa could be found, ATR FTIR measurements have been performed for one of the thick single DLCH layers and are shown exemplarily. Absorbance versus wavenumber is displayed with FIG. 11A for stretching C—H modes and with FIG. 11B for bending C—H modes wherein $sp^3$ hybridization could be seen for C—H, CH, $CH_2$ and $CH_3$ bonds. The presence of these FTIR features also confirms a presence of hydrogen in the DLCH film.

Quantification of the $sp^3$ content however has been verified by solid 130 NMR. Therewith a sum signal from C—C and C—H bonds is measured at a chemical shift of about 40 and 140 ppm, wherein the C—H bonds are estimated to give a relatively stronger signal. An $sp^3$ proportion from 51 to 55% referring to $sp^2/sp^3$ ratios from 0.8 to 0.95 could be found by fitting data from the measurement signals. An example and exemplary data of such measurements can be seen in FIG. 12, respectively looked up in Table 6. The following measurement set up was used: 10 kHz rotation, 4 mm CP/MAS Sample head at 400.2 MHz ($^1H$), 100.6 MHz ($^{13}C$). Raman parameters as shown above and in Table 4, according to respective Raman investigations from Ferrari and Robertson, correlate well with parameters as defined by NMR $sp^3$ content.

Density of the DLCH layer material has been deducted from correlating NMR $sp^3$ and Raman FWHM (G) data with state of the art investigations as well as from indexes of refraction measured at 635 nm (e.g. n=1.75) which estimates a density range from 1.2 to 2.2 $g/cm^3$.

Internal layer stress as measured for some ta-C:H layers of different thickness is displayed in FIG. 13. It can be seen that internal stress grows from about 281 MPa for a 96 nm layer to 424 MPa with a 24 nm layer. Such layers have been deposited directly on to a glass substrate.

Water contact angles (WCA) for 24 nm DLCH layers have been measured within one day after deposition. Such WCA values were 53.1±0.8 as can be seen exemplarily in FIG. 14.

The invention claimed is:

1. A process to produce a scratch resistant coated article, the process comprising:
   providing a flat glass substrate having a surface to be coated; and
   depositing a multilayered coating on the surface in corresponding sequence coming from the surface:
      a functional layer stack (11, 11', 11") comprising at least one metallic silver inclusive layer (2, 4) sandwiched between two dielectric layers (1, 3, 5);
      a transition metal (TM) inclusive layer (6) comprising carbon in a molar amount, which at least at an outer surface of the TM inclusive layer equals at least to the molar metal amount of TM metal(s); and
      a hydrogen containing DLC (DLCH) layer (7) in direct contact to the outer surface of the TM inclusive layer as an outermost layer of the coating,
   wherein the hydrogen containing DLC (DLCH) layer (7) is deposited in direct contact to the TM inclusive layer as an outermost layer of the coating by an inductively coupled plasma process (ICPP) using a mixture of a carbonaceous gas and an inert gas, and
   wherein a DLCH layer (7) is produced having an average surface roughness as measured with atomic force microscopy (AFM) which is smaller 10 nm, having a hardness of the DLCH layer in a range from 6 GPa to 9 GPa, and having a mass density of the DLCH layer from 1.2 g/cm$^3$ to 2.2 g/cm$^3$.

2. The process according to claim 1, characterized in that the depositing of the TM inclusive layer comprises sputtering a TM target in the inert gas and optionally oxygen gas containing sputter-atmosphere.

3. The process according to claim 1, characterized in that the depositing of the TM inclusive layer comprises sputtering a target consisting of at least one of Ti, TiNb, TiZr, Nb, Zr, NbZr TiO$_x$C$_y$, TiNbO$_x$C$_y$, TiZrO$_x$C$_y$, NbO$_x$C$_y$, ZrO$_x$C$_y$, and NbZrO$_x$C$_y$, in a carbon gas containing atmosphere,
   wherein $0.1 \leq x \leq 3, 0 \leq y \leq 1$.
   to deposit a TM layer consisting of at least one of TiO$_x$C$_y$, TiNbO$_x$C$_y$, TiZrO$_x$C$_y$, NbO$_x$C$_y$, ZrO$_x$C$_y$, NbZrO$_x$C$_y$,
   wherein $0 \leq x \leq 2$ and $1 \leq y \leq 6$.

4. The process according to claim 1, characterized in that the depositing of the TM inclusive layer comprises sputtering a (Ti$_a$ Zr$_b$ Y$_c$ Hf$_d$) O$_x$ C$_y$ target or a (Ti$_a$ Zr$_b$ Y$_c$ Hf$_d$) target in a carbon gas containing atmosphere, wherein
   $a+b+c+d=1$,
   $0.5 \leq a \leq 1, 0 \leq b \leq 0.5, 0 \leq c \leq 0.02, 0 \leq d \leq 0.01$
   and $1 \leq x \leq 2, 0 \leq y \leq 1$
   to deposit a (Ti$_a$ Zr$_b$ Y$_c$ Hf$_d$) O$_x$ C$_y$ layer, wherein
   $a+b+c+d=1$,
   $0.5 \leq a \leq 1, 0 \leq b \leq 0.5, 0 \leq c \leq 0.02, 0 \leq d \leq 0.01$
   and $0 \leq x \leq 2$ and $1 \leq y \leq 6$.

5. The process according to claim 4, characterized in that the carbon gas is methane.

6. The process according to claim 4, characterized in that a flow of the carbon gas in the sputter atmosphere is adjusted to deposit a TMO$_x$C$_y$ layer having a molar metal to carbon ratio of $1.0 \leq Me/C \leq 0.01$ at least at the surface in direct contact with the DLCH layer.

7. The process according to claim 1, characterized in that an inductively coupled plasma process (ICPP) provides an ion current density from 0.01 mA/cm$^2$ to 3.5 mA/cm$^2$ to the surface.

8. The process according to claim 7, characterized in that an ion energy of the ICPP is 10 eV to 70 eV.

9. The process according to claim 1, characterized in that the carbonaceous gas is acetylene (C$_2$H$_2$).

* * * * *